Sept. 15, 1942.　　　　　O. C. COX　　　　　2,295,716
PIPE UNION
Filed Feb. 28, 1941　　　　2 Sheets-Sheet 1
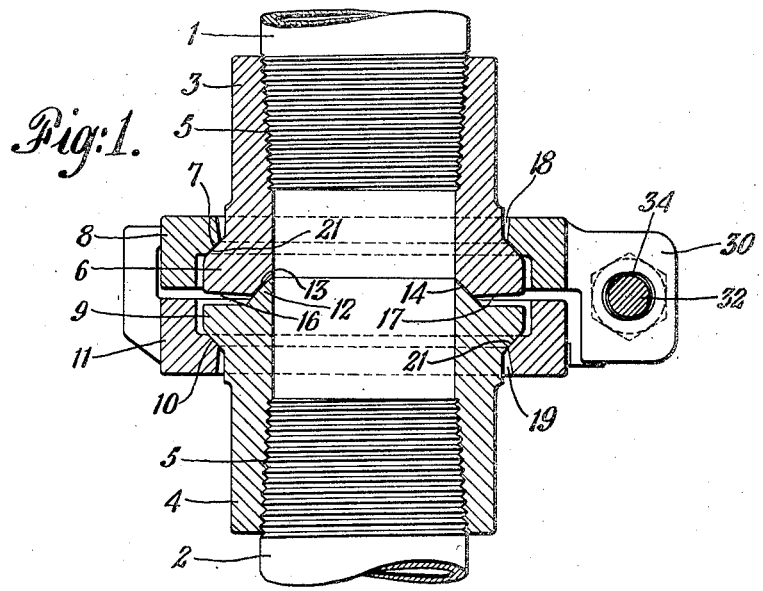
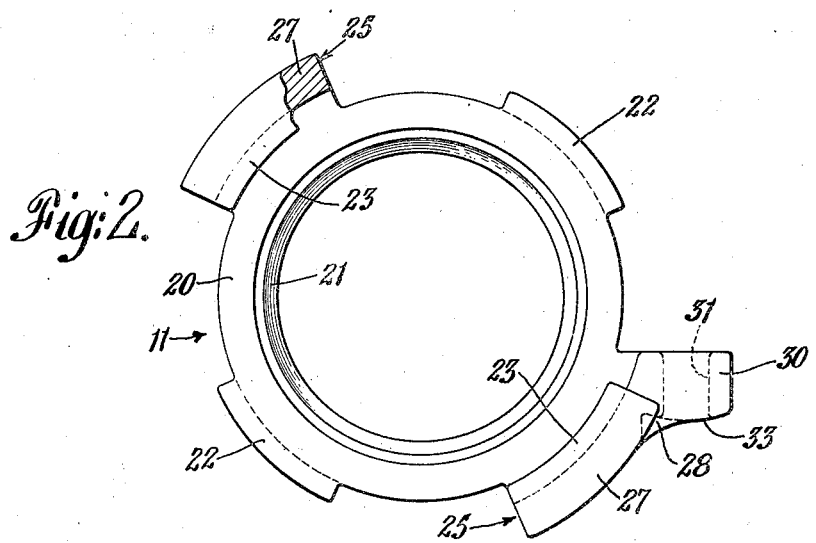
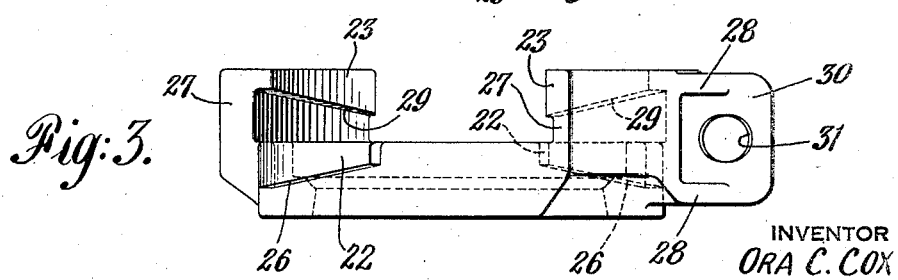
INVENTOR
ORA C. COX
BY
Clarence D Kerr
ATTORNEY Sept. 15, 1942.　　　O. C. COX　　　2,295,716
PIPE UNION
Filed Feb. 28, 1941　　　2 Sheets-Sheet 2
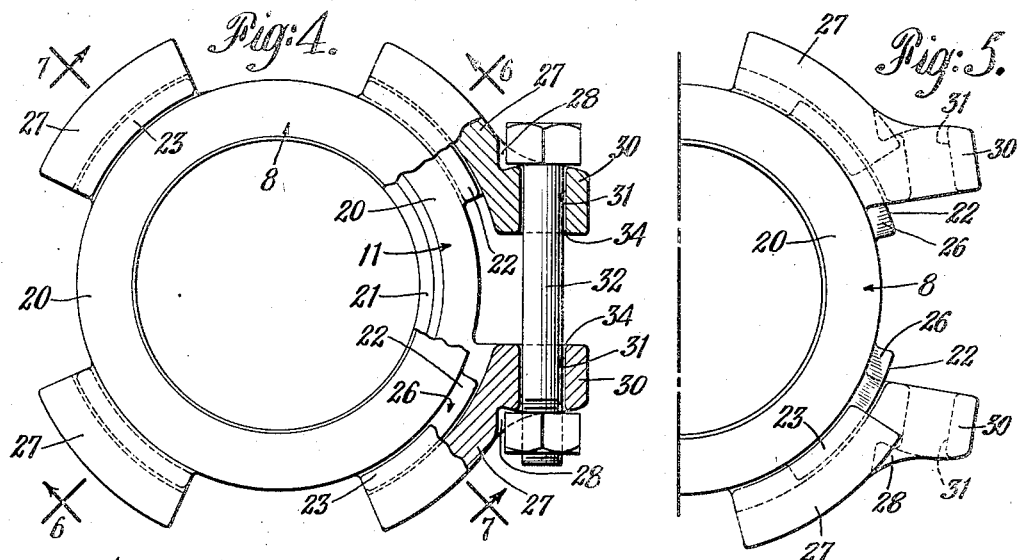
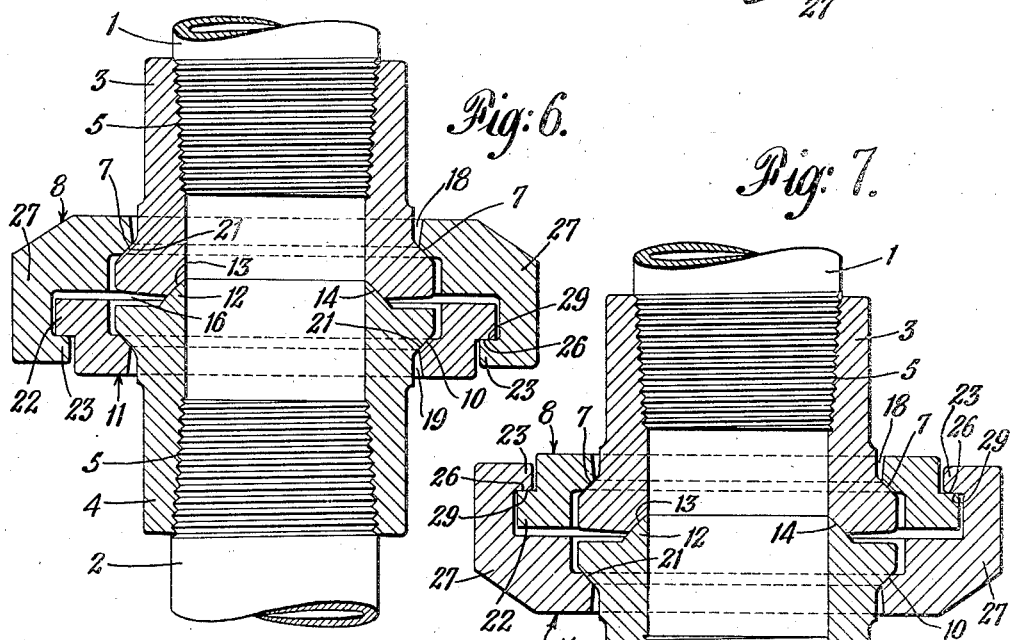
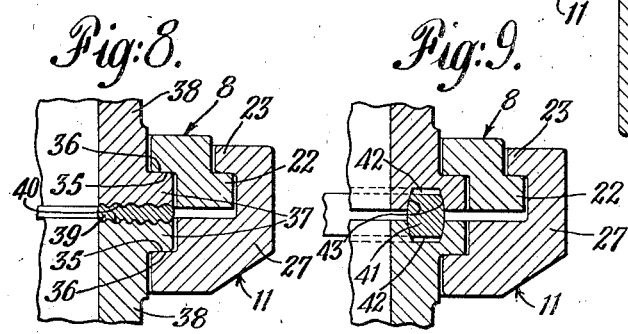
INVENTOR
ORA C. COX
BY
Clarence O Kerr
ATTORNEY Patented Sept. 15, 1942

2,295,716

UNITED STATES PATENT OFFICE 2,295,716

PIPE UNION

Ora C. Cox, Elmhurst, Ill.

Application February 28, 1941, Serial No. 381,042

6 Claims. (Cl. 285—129)

The invention relates to pipe unions or couplings, and more particularly to improvements in unions of the type which is adapted to be secured by a single bolt or locking means.

It is an object of my invention to provide a pipe union which can be more easily and quickly applied and removed than unions heretofore known or used, and which also is characterized by simplicity of construction and great strength.

Another object of the invention is to provide a union of the class described which comprises duplicate companion parts.

A further object is to provide locking rings or nuts for pipe unions which can be drawn together by a hammer blow or by a single bolt, and which are independent of both pipe ends or attaching nipples.

A further object is to provide locking rings or nuts which can be turned to any position where they can be tightened most conveniently without disturbing either of the pipe ends, i. e., so that the single clamping bolt is swung into the most accessible location.

Other objects and advantages of my invention will appear as the description proceeds. In the drawings, wherein I have illustrated a preferred embodiment of the invention:

Fig. 1 is a longitudinal sectional view of a union constructed in accordance with my invention.

Fig. 2 is a face view of one of the complemental locking rings or nuts employed in the construction shown in Fig. 1; and Fig. 3 is a side view of the same nut.

Fig. 4 is a plan view of the union, partly in section; and Fig. 5 is a similar view illustrating an intermediate position of the locking rings during their application to the pipe ends.

Figs. 6 and 7 are longitudinal sectional views taken respectively on the lines 6—6 and 7—7 of Fig. 4.

Figs. 8 and 9 are detail views showing alternative embodiments of the invention. These views are in transverse vertical section.

Referring to Fig. 1, I have shown my improved union applied to adjacent pipe ends 1 and 2 to which the nipples or pipe end members 3 and 4 are secured in any convenient manner. For this purpose I have shown a conventional pipe thread joint 5. The end of the nipple 3 is provided with a peripheral flange 6 having a spherical surface 7 formed thereon for engagement with a complementary spherical surface on the locking ring or nut 8. Similarly, the nipple 4 is provided with a peripheral flange 9 having a spherical surface 10 for engagement with a complementary spherical surface formed on the locking ring or nut 11. The end of the nipple 4 projects beyond the flange 9 as at 12 to provide a spherical surface 13 for engagement with a complementary spherical surface 14 formed in a recess in the end of the nipple 3. The meeting ends of the nipples are so designed as to leave a clearance at 16 which may be somewhat wider at the outside than at the inside. As shown, the end of the nipple 3 is beveled or tapered as at 17 to provide for increased clearance toward the outside, thus permitting increased angular adjustment between the two nipples while retaining a maximum area of contact between the engaging spherical surfaces 13 and 14. Clearances are also provided between the nipple 3 and nut 8 at 18, and between the nipple 4 and nut 11 at 19. These clearances permit angular displacement between the respective nipples and nuts or locking rings.

An important feature of the invention resides in so constructing the locking rings 8 and 11 that they can be exact counterparts of one another. The design of these rings will now be described with particular reference to Figs. 2 and 3 of the drawings. Inasmuch as the two rings are exact counterparts, only one will be described. It consists of an annulus 20 having a spherical surface 21 for engagement with a complementary spherical surface 7 of the nipple 3, or surface 10 of the nipple 4. The annulus 20 is provided with a plurality of attaching lugs disposed around its periphery. As shown, there is a pair of outwardly projecting lugs 22 and a pair of inwardly projecting lugs 23. The lugs 22 may be formed as outwardly extending projections integral with the annulus 20, are arcuate in form, and are provided at their under sides with inclined cam surfaces 26. The lugs 23 may consist of flanges projecting inwardly from arcuate extensions 27 of the annulus 20. The lugs 23 also are arcuate in form and are provided at their under sides with inclined cam surfaces 29. The inclined cam surfaces 26 of the lugs 22 are offset, longitudinally of the union, with respect to the inclined cam surfaces 29 of the lugs 23. It will be observed, moreover, that the cam surfaces 26 and 29 are in circumferential alignment. Projecting laterally from the annulus 20 is an ear 30. This ear preferably is located adjacent one of the extensions 27 so as to be made integral therewith and thus strengthen the connection between the ear and the ring proper. Webs 28 further serve to strengthen this connection. The ear 30 is apertured at 31 to receive a locking bolt 32 (Fig. 4). One side of the ear 30 preferably is made arcuate in form, as at 33, so that the head or nut of the locking bolts can be turned freely during application and removal of the union. Also, there is a substantial clearance at 34 between the aperture 31 and bolt 32 so that there will be no binding when the bolt is initially inserted and before the ears of the two locking rings have been drawn into parallelism.

One of the locking ring or nut members is assembled with each of the nipples 3 and 4 when the latter are applied to the pipe ends. The lugs 22 and 23 of one of the nuts are then brought opposite the spaces between the lugs 22 and 23 of the other nut, whereupon the complementary surfaces 13, 14 of the nipples 3 and 4 are brought together. The vertical surfaces 25 of the extensions 27 and lugs 23 of one nut overlap the corresponding surfaces 25 of the other nut and serve as guides for the proper positioning of the two nuts to bring the lugs 22 and 23 of the one nut opposite the spaces between the lugs 22 and 23 of the other nut during assembly. The locking rings are then rotated relative to one another in order to bring about an initial locking engagement between the lugs 22 and 23 of the two rings, as shown in Fig. 5. In this position, and in the final locking position, the lugs 22 of the one locking element engage the lugs 23 of the other locking element. The two locking rings or nuts may be brought into locking relationship by striking one of the ears 30 with a hammer, or the bolt 32 may be inserted when these parts are in the position shown in Fig. 5 and the ears 30 be drawn together by tightening the bolt. In either case, the engaging cam surfaces 26 and 29 of the respective nuts are drawn up so as to pull the nipples 3 and 4 tightly together.

It will be observed that the nuts or locking rings 8 and 11 are constructed and arranged to be freely mounted on the pipe end members so that the rings can be rotated around the axis of the pipe ends or nipples until the locking ears 30 are brought into the most convenient position for insertion and tightening of the clamping bolt 32. Moreover, the locking nuts 8 and 11 are arranged for a certain amount of angular movement relative to each of the nipples. Angular movement of the nipple 3 relative to the nipple 4 and to the locking ring assembly is facilitated by making the spherical surfaces 7 and 14 of the nipple 3 concentric.

In the embodiment of my invention which is illustrated in Fig. 8, the construction of the complementary locking rings 8 and 11 is the same as has been described with reference to Figs. 1 to 7, except that the spherical surfaces 21 (Fig. 2) are replaced by plane surfaces 35 which engage complementary surfaces 36 of flanges 37 of the nipples or pipe end members 38. A gasket 39 of suitable resilient or sealing material is compressed between the nipples 38 as the locking rings are drawn into locking relationship. If desired, the meeting ends of the nipples may be grooved circumferentially, as at 40, to assist in forming a liquid-tight connection.

Another embodiment of my invention is illustrated in Fig. 9. This embodiment is the same as that described in the preceding paragraph with reference to Fig. 8 except that a sealing ring 41 is employed in lieu of the gasket 39. The meeting ends of the nipples 38 are grooved circumferentially, as at 42, to receive the locking ring 41 which may be of metal, or of suitable compressible material. The sides of the grooves 42 preferably are tapered or curved, as at 43, so as to provide a wedging action between the grooves and the sealing ring which may be correspondingly tapered or curved.

The locking rings and nipples of the constructions I have described may be made of ferrous or non-ferrous metal or metal alloys, and may be formed by conventional casting or die forging processes. I prefer to make them as split-die forgings of high manganese open hearth steel. I also prefer that all parts be permanently lubricated and rust-proofed by cadmium plating. The engaging surfaces 7, 10, 21, 13 and 14 may be machined, and I prefer that the machined surfaces also be rolled under heavy pressure to assure smoothness. The cam surfaces 26 and 29 of the locking ring lugs also may be machined, if desired.

The term "pipe and members" as used herein and in the appended claims is defined as including members such as the nipples 3 and 4, as well as pipe members which may be formed with integral end flanges. The other terms and expressions which I have employed are used as terms of description and not of limitation, and I have no intention of excluding such equivalents of the invention set forth, or of portions thereof, as fall within the purview of the claims.

I claim:

1. A pipe union comprising duplicate rings having a plurality of outwardly extending lugs and a plurality of inwardly extending lugs, the outwardly extending lugs of one ring being constructed and arranged for interlocking engagement with the inwardly extending lugs of the other ring, and all of the engaging surfaces of the lugs being inclined with respect to a plane normal to the axes of the rings.

2. A pipe union comprising duplicate rings having a plurality of outwardly extending lugs and a plurality of inwardly extending lugs, the outwardly extending lugs of one ring being constructed and arranged for interlocking engagement with the inwardly extending lugs of the other ring, and the engaging surfaces of the lugs being inclined with respect to a plane normal to the axes of the rings, the rings also having substantially spherical surfaces for engagement with pipe end members.

3. A pipe union comprising duplicate locking rings having interlocking cam surfaces for drawing them together and having bolt-engaging means at one side thereof, the rings being constructed and arranged to be freely mounted on pipe end members so that they can be rotated about their axes to bring the bolt-engaging means into any desired position.

4. A pipe union comprising duplicate locking rings having interlocking cam surfaces for drawing them together and having bolt-engaging means at one side thereof, the rings having surfaces for engagement with pipe end members.

5. A pipe union comprising a pair of nipples and a pair of duplicate locking rings, the two nipples having substantially spherical complementary surfaces and the rings and nipples having substantially spherical complementary surfaces, the locking rings having interlocking cam surfaces to draw the rings against the nipples.

6. A pipe union comprising duplicate locking rings having interlocking cam surfaces for drawing said rings together upon relative rotation thereof, and radially extending bolt-engaging lugs arranged at one side of said rings, said rings having surfaces for engagement with pipe end members.

ORA C. COX.